(12) United States Patent
Mueller

(10) Patent No.: US 12,298,774 B2
(45) Date of Patent: May 13, 2025

(54) COMPUTER ARCHITECTURE FOR IDENTIFICATION OF NONLINEAR CONTROL POLICIES

(71) Applicant: Smart Information Flow Technologies, LLC, Minneapolis, MN (US)

(72) Inventor: Joseph B. Mueller, Champlin, MN (US)

(73) Assignee: Smart Information Flow Technologies, LLC, Minneapolis, MN (US)

( * ) Notice: Subject to any disclaimer, the term of this patent is extended or adjusted under 35 U.S.C. 154(b) by 545 days.

(21) Appl. No.: 17/735,603

(22) Filed: May 3, 2022

(65) Prior Publication Data

US 2023/0359208 A1 Nov. 9, 2023

(51) Int. Cl.
*G05D 1/69* (2024.01)
*G05D 1/00* (2006.01)
(Continued)

(52) U.S. Cl.
CPC ......... *G05D 1/0214* (2013.01); *G05D 1/0027* (2013.01); *G05D 1/0055* (2013.01);
(Continued)

(58) Field of Classification Search
CPC .. G05D 1/0027; G05D 1/0295; G05D 1/0297; G05D 2101/15; G05D 2105/35;
(Continued)

(56) References Cited

U.S. PATENT DOCUMENTS 9,165,470 B2 10/2015 Mudalige et al.
11,691,650 B2 * 7/2023 Li .................. B60W 60/00272
706/15
(Continued)

FOREIGN PATENT DOCUMENTS

CN 112445229 B 10/2021
EP 2685338 A1 1/2014
(Continued)

OTHER PUBLICATIONS

Brunton, Steven L., Joshua L. Proctor, and J. Nathan Kutz. "Discovering governing equations from data by sparse Identification of nonlinear dynamical systems." Proceedings of the national academy of sciences 113.15 (2016): 3932-3937.
(Continued)

*Primary Examiner* — Dino Kujundzic
(74) *Attorney, Agent, or Firm* — Young Basile Hanlon & MacFarlane, P.C.

(57) ABSTRACT

A computer generates historical time and velocity data for vehicles based on data from sensor(s) observing the vehicles. The computer determines, based on the historical time and velocity data, a control policy that controls movement of the vehicles. The control policy is represented as a weighted combination of a set of predefined policies. Determining the control policy comprises calculating weights or parameters for a weighted combination of the set of predefined policies that minimizes a residual error term. The residual error term is computed based on a difference between the historical time and velocity data and predicted time and velocity data associated with the weighted combination of the set of predefined policies. The computer determines an action plan based on the determined nonlinear control policy. The computer transmits, to a machine, a
(Continued)

control signal causing the machine to perform or simulate at least a part of the determined action plan.

18 Claims, 8 Drawing Sheets

(51) Int. Cl.
G05D 101/15 (2024.01)
G05D 105/35 (2024.01)
G05D 105/85 (2024.01)

(52) U.S. Cl.
CPC .............. *G05D 1/0295* (2013.01); *G05D 1/69* (2024.01); *G05D 2101/15* (2024.01); *G05D 2105/35* (2024.01); *G05D 2105/85* (2024.01)

(58) Field of Classification Search
CPC ........ G05D 2105/85; G08G 1/22; G08G 1/20; G06N 3/0464; G06N 3/09; G06N 3/084
See application file for complete search history.

(56) References Cited

U.S. PATENT DOCUMENTS

| | | | |
|---|---|---|---|
| 2008/0059007 | A1 | 3/2008 | Whittaker et al. |
| 2018/0074505 | A1* | 3/2018 | Lv .................. B60W 60/00272 |
| 2020/0293009 | A1* | 9/2020 | Quirynen ............. G05B 13/041 |
| 2021/0009163 | A1* | 1/2021 | Urtasun ............... G08G 1/0133 |
| 2021/0341920 | A1* | 11/2021 | Singh ..................... G06N 3/088 |
| 2022/0097690 | A1* | 3/2022 | Dede .................. G01C 21/3602 |
| 2023/0316920 | A1* | 10/2023 | Di Cairano ............ G08G 1/083 701/26 |

FOREIGN PATENT DOCUMENTS

| | | |
|---|---|---|
| EP | 3210090 B1 | 10/2020 |
| WO | 2014003630 A1 | 1/2014 |
| WO | 2018052602 A1 | 3/2018 |
| WO | 2020034052 A1 | 2/2020 |

OTHER PUBLICATIONS

Zhang, Linan, and Hayden Schaeffer. "On the convergence of the SINDy algorithm." Multiscale Modeling & Simulation 17.3 (2019): 948-972.

Kaiser, Eurika, J. Nathan Kutz, and Steven L. Brunton. "Sparse identification of nonlinear dynamics for model predictive control in the low-data limit." Proceedings of the Royal Society A 474.2219 (2018): 20180335.

Zheng, Hehui, et al. "An adversarial approach to private flocking in mobile robot teams." IEEE Robotics and Automation Letters 5.2 (2020): 1009-1016.

Gazi, Veysel, and Kevin M. Passino. "A class of attractions/repulsion functions for stable swarm aggregations." International Journal of Control 77.18 (2004): 1567-1579.

H. E. Sungu, M. Inoue and J. Imura, "Nonlinear spacing policy based vehicle platoon control for local string stability and global traffic flow stability," 2015 European Control Conference (ECC), 2015, pp. 3396-3401, doi: 10.1109/ECC.2015.7331059.

A. Bono, G. Fedele and G. Franzè, "A Swarm-Based Distributed Model Predictive Control Scheme for Autonomous Vehicle Formations in Uncertain Environments," in IEEE Transactions on Cybernetics, doi: 10.1109/TCYB.2021.3070461.

* cited by examiner

COMPUTER ARCHITECTURE FOR IDENTIFICATION OF NONLINEAR CONTROL POLICIES

TECHNICAL FIELD

Embodiments pertain to computer architecture. Some embodiments relate to artificial intelligence. Some embodiments relate to identification of nonlinear control policies.

BACKGROUND

A group of vehicles may be moving according to a control policy. Techniques for identification of the control policy may be desirable.

DETAILED DESCRIPTION

Figure 1:
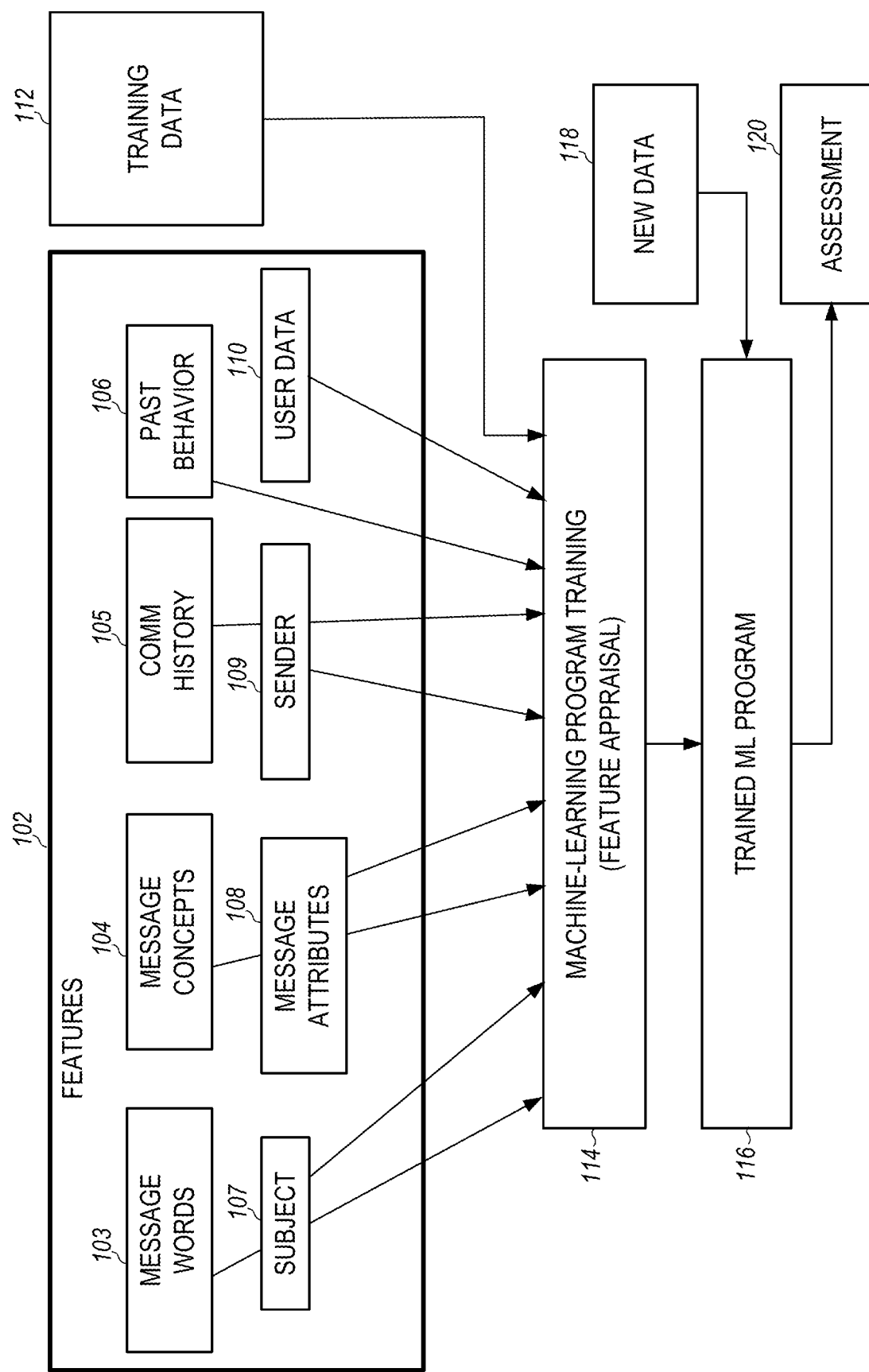
FIG. 1 illustrates the training and use of a machine-learning program, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, a group of vehicles (e.g., military vehicles) may be moving according to a control policy that is unknown to a computing device (e.g., belonging to an opponent of the military vehicles). Techniques for identification of the control policy may be desirable.

For example, in a military context, sensor(s) may observe enemy military vehicles traveling to generate historical time and position data of the enemy military vehicles. Identifying a control policy that controls the vehicles, for example, identifying a swarm leader vehicle which other vehicles follow, may be desirable. The identified control policy may be used, for example, to determine an action plan responsive to the control policy (e.g., if the vehicles appear to be moving towards a target, the action plan may include defending or fortifying the target). The action plan may be performed or simulated at a computing device.

According to some embodiments, a computing device accesses sensor data from one or more sensors observing vehicles. The sensors may include at least one of cameras (e.g., visual sensors), radar sensors, lidar sensors, or the like. Using the sensor data, the computing device generates historical time and position (t, x) data for the vehicles. The computing device may compute historical time and velocity (t, v) data for the vehicles based on the historical time and position data, for example, based on the velocity with respect to time being the first derivative of position with respect to time for each vehicle: $v(t) = d\, x(t)/dt$, where v represents velocity, t represents time, x represents position, and d represents derivative.

The computing device determines, based on the historical time and velocity data, a nonlinear control policy that controls movement of the plurality of vehicles. The nonlinear control policy is determined to be a weighted combination of a set of predefined policies. Determining the nonlinear control policy includes calculating weights or parameters for a weighted combination of the set of predefined policies that minimizes a residual error term. The residual error term is computed based on a difference between the historical time and velocity data and predicted time and velocity data associated with the weighted combination of the set of predefined policies.

After determining the nonlinear control policy, the computing device determines an action plan based on the determined nonlinear control policy. In a military context, the action plan may be responsive to enemy actions or goals that are identified based on the determined nonlinear control policy. The computing device transmits, to a machine external to the computing device, a control signal causing the machine to perform or simulate at least part of the determined action plan. For example, if the nonlinear control policy is associated with attacking a target, the action plan may involve moving other vehicles toward the target to defend the target.

As used herein, the term "historical" encompasses its plain and ordinary meaning. Historical data may include data associated with a time that precedes a current time. Historical data may be associated with data one second, 10 seconds, one minute, one hour, one day, one century, or any other amount of time ago.

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software, the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As used herein, the term "model" encompasses its plain and ordinary meaning. A model may include, among other things, one or more engines which receive an input and compute an output based on the input. The output may be a classification. For example, an image file may be classified as depicting a cat or not depicting a cat. Alternatively, the image file may be assigned a numeric score indicating a likelihood whether the image file depicts the cat, and image files with a score exceeding a threshold (e.g., 0.9 or 0.95) may be determined to depict the cat.

This document may reference a specific number of things (e.g., "six mobile devices"). Unless explicitly set forth otherwise, the numbers provided are examples only and may be replaced with any positive integer, integer or real number, as would make sense for a given situation. For example, "six mobile devices" may, in alternative embodiments, include any positive integer number of mobile devices. Unless otherwise mentioned, an object referred to in singular form (e.g., "a computer" or "the computer") may include one or multiple objects (e.g., "the computer" may refer to one or multiple computers).

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the n'h epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 2:
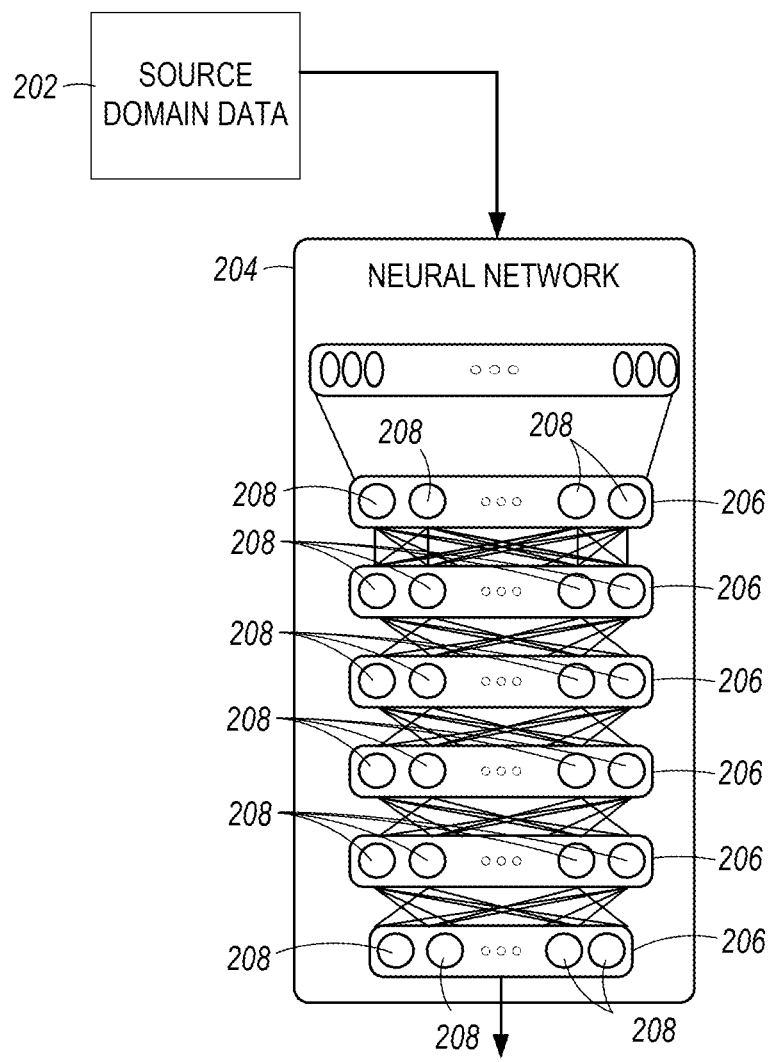
FIG. 2 illustrates an example neural network, in accordance with some embodiments.
Figure 2:
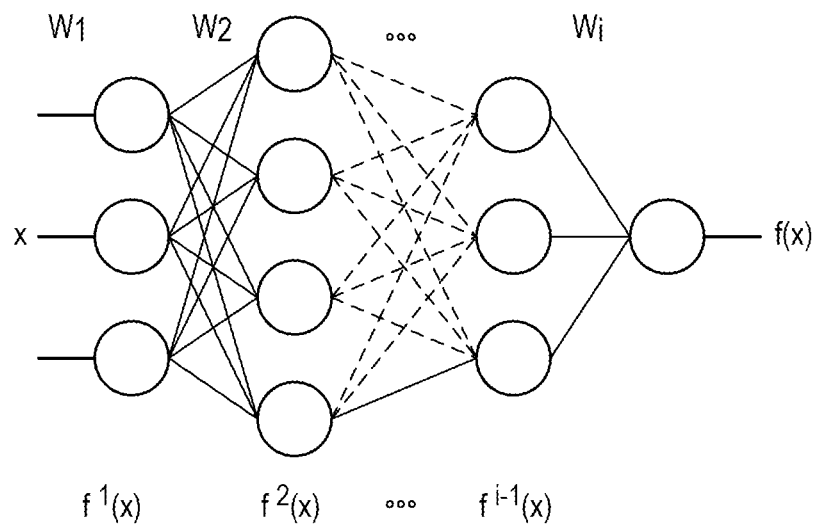

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{i-1}(x)$, until finally the output $f(x)$ is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM node serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
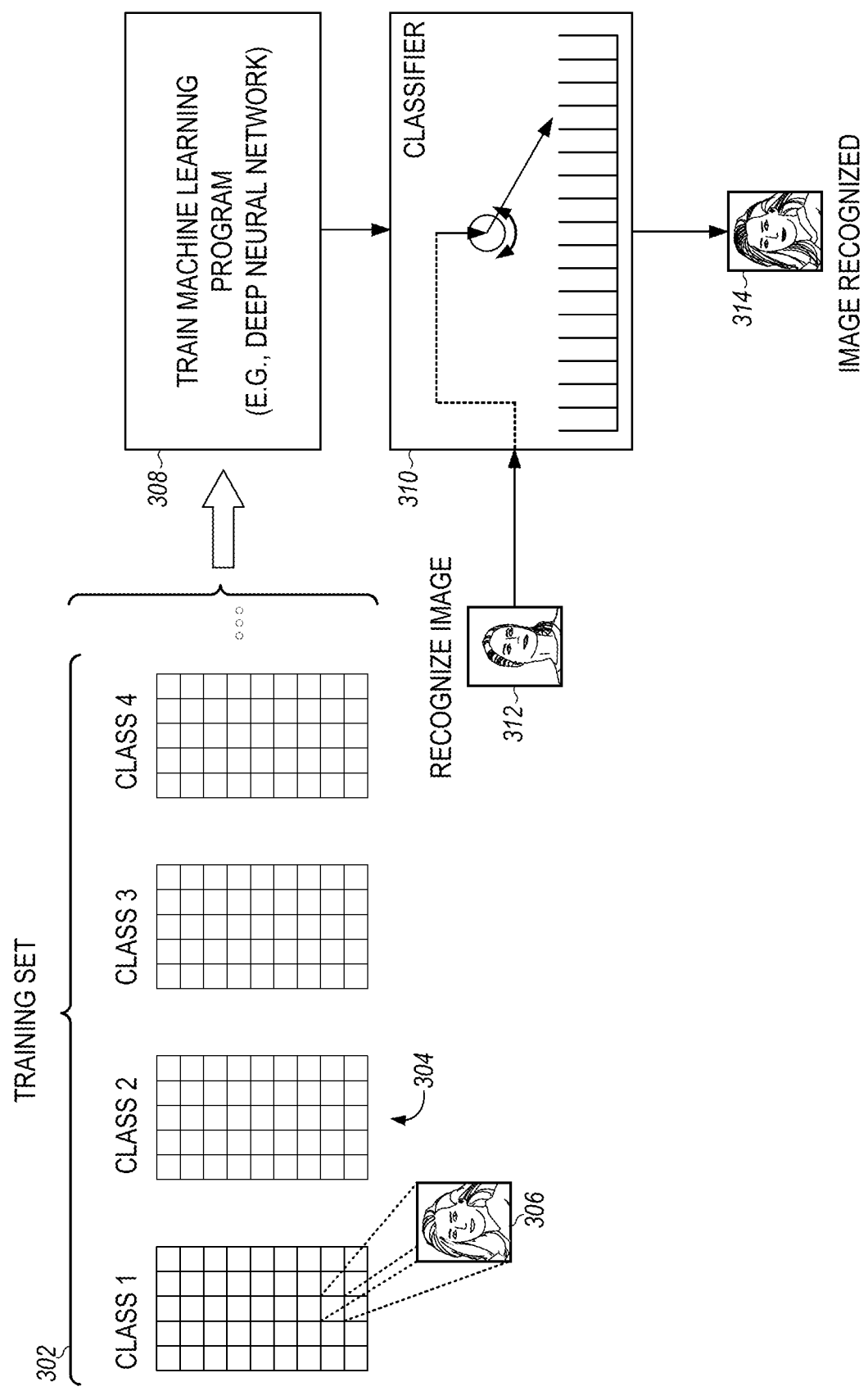
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Barack Obama, one class corresponds to George W. Bush, one class corresponds to Bill Clinton, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
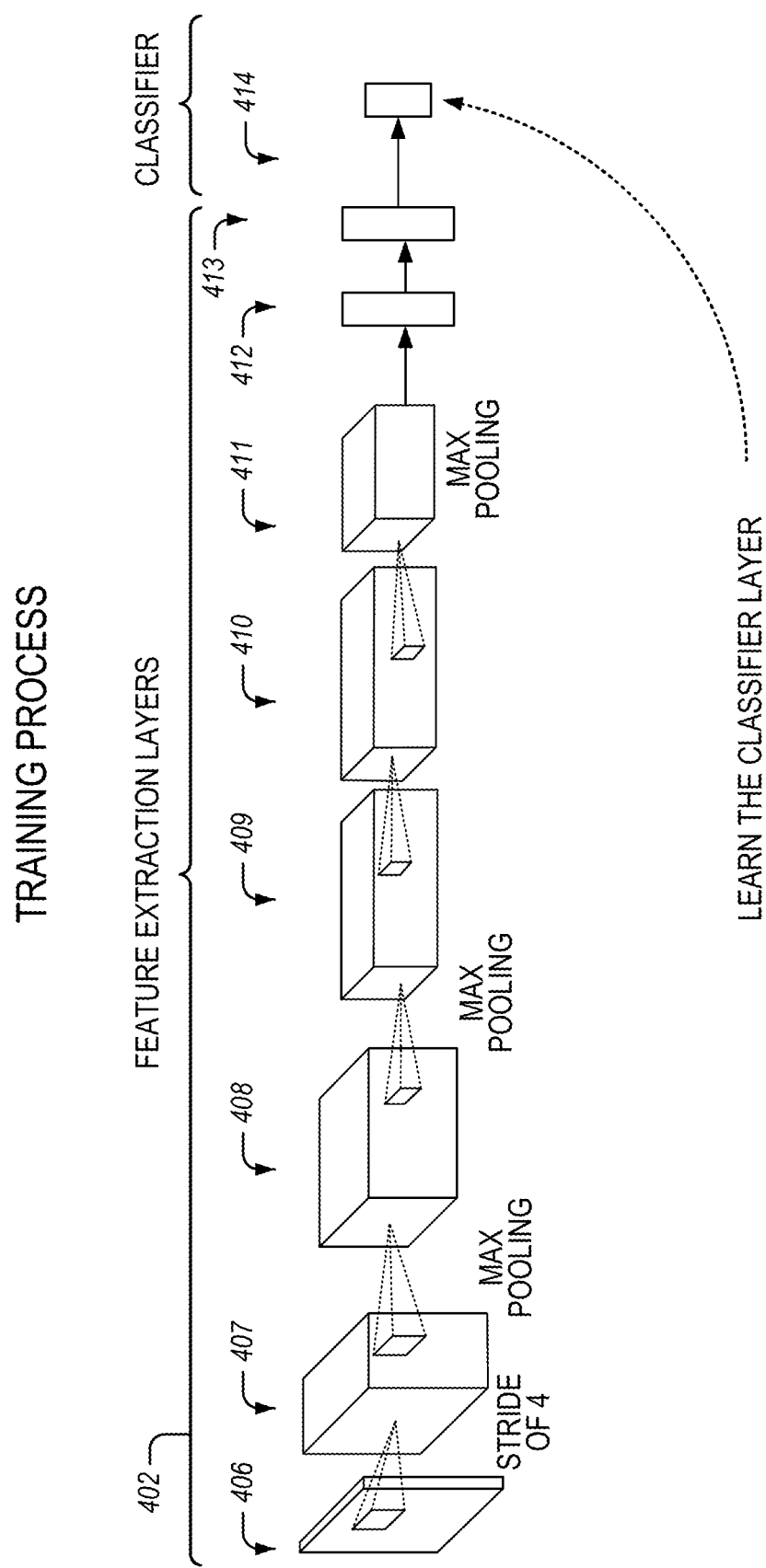
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
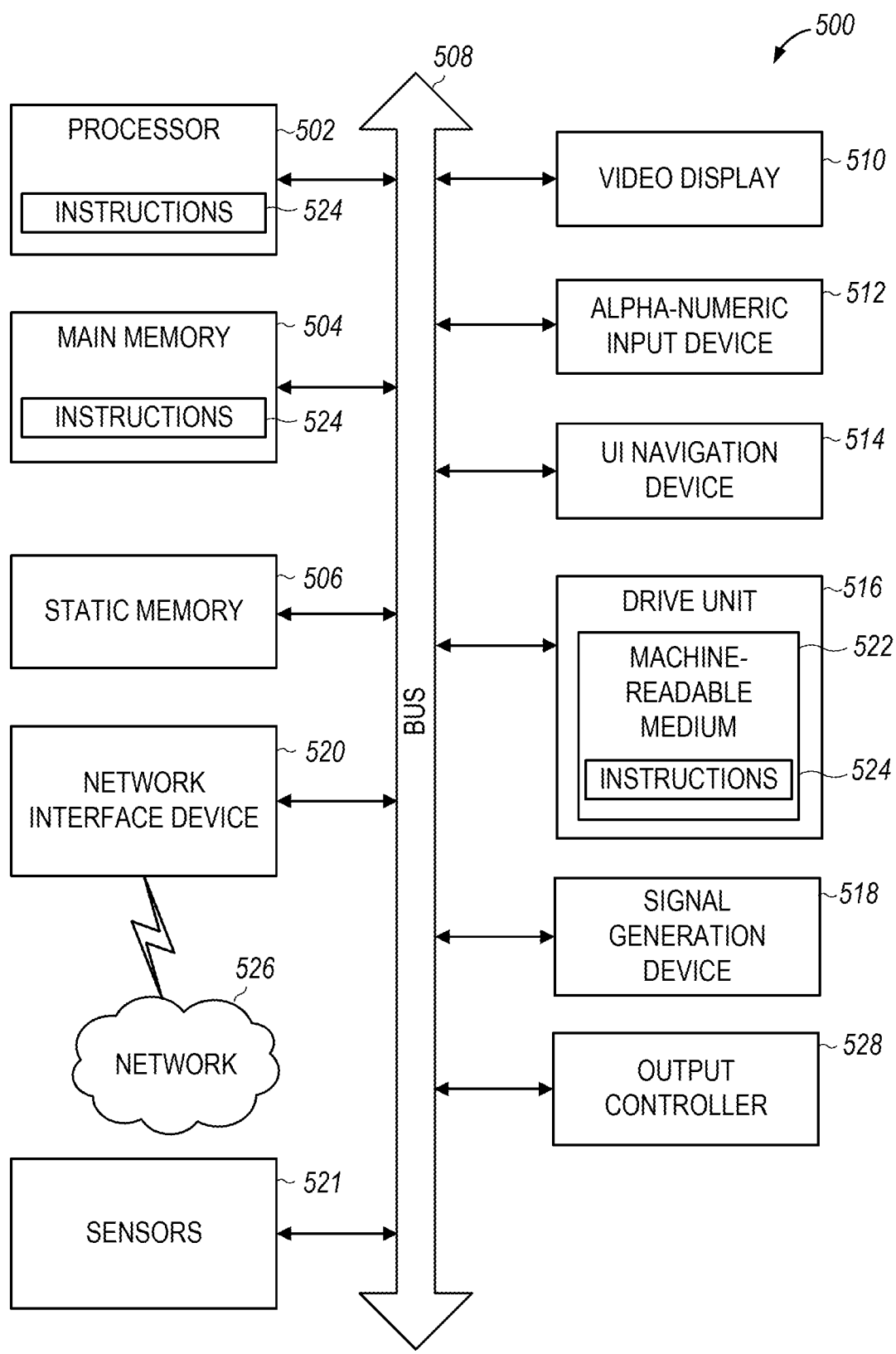
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

As used herein, the term "computing device" encompasses its plain and ordinary meaning. A computing device may include all or a portion of the components of the computing machine 500. Alternatively, a computing device may include one or more computing machines, such as the computing machine 500. A computing device may be, for example and without limitation, at least one of: a server computer, a desktop computer, a laptop computer, a mobile phone, a tablet computer, a digital music player, a smart watch, a personal digital assistant, or a smart television including processing circuitry and memory.

Figure 6:
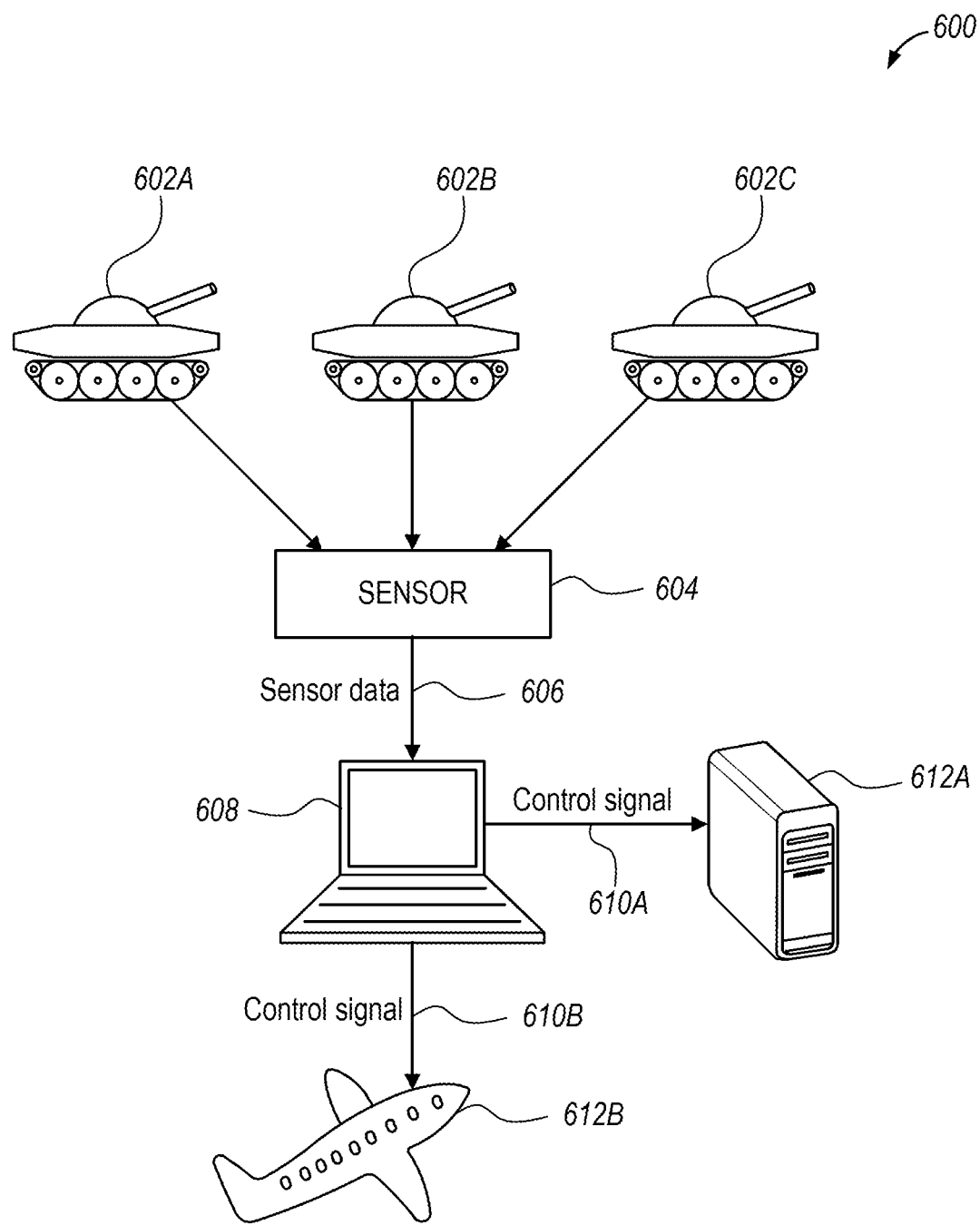
FIG. 6 illustrates an example of a system for control policy identification, in accordance with some embodiments.

FIG. 6 illustrates an example of a system 600 for control policy identification, in accordance with some embodiments. As shown in FIG. 6, vehicles 602A, 602B, and 602C are observed by a sensor 604. While three vehicles 602A, 602B, and 602C, and a single sensor 604 are illustrated, other numbers of vehicles and other numbers of sensors may be used in alternative implementations. The vehicles 602A, 602B, and 602C may be, for example, enemy military vehicles, for example, tanks, ships, airplanes, or the like. The sensor 604 may include at least one of a camera, a radar sensor, a lidar sensor, or the like.

The sensor 604 transmits sensor data 606 (e.g., images, doppler radar readings, or the like) to a computing device 608. The computing device 608 may include all or a portion of the components of the computing machine 500. The computing device 608 generates, based on the sensor data 606, historical time and velocity data for the vehicles 602A, 602B, and 602C. The computing device 608 determines, based on the historical time and velocity data, a control policy (e.g., a nonlinear control policy) that controls movement of the vehicles 602A, 602B, and 602C. The control policy is represented as a weighted combination of a set of predefined policies (e.g., at least one of alignment, cohesion, or repulsion). Determining the nonlinear control policy may include calculating weights or parameters for a weighted combination of the set of predefined policies that minimizes a residual error term. The residual error term is computed based on a difference between the historical time and velocity data and predicted time and velocity data associated with the weighted combination of the set of predefined policies. The computing device 608 may determine the control policy using artificial intelligence or machine learning techniques, for example, as described in conjunction with FIGS. 1-4. In some implementations, the vehicle 602A, 602B, and 602C are traveling in a swarm with a swarm leader and other vehicles following the swarm leader. Determining the control policy may include identifying one of the vehicles 602A, 602B, and 602C as the swarm leader vehicle and/or identifying other vehicles following the swarm leader vehicle. For example, the vehicle 602B may be identified as the swarm leader vehicle, and the vehicles 602A and 602C may be identified as follower vehicles of the swarm leader vehicle.

As used herein, the term "control policy" encompasses its plain and ordinary meaning. A control policy may include a policy for governing the behavior of a dynamic system, such as a set of vehicles traveling together. A linear control policy obeys the superposition principle and is governed by linear differential equations. A nonlinear control policy does not obey the superposition principle and may be governed by nonlinear differential equations. The superposition principle states that, for a function f, f(a+b)=f(a)+f(b), and f(ab)=a*f (b), where a and b are numbers. A control policy may include a set of rules that determines the signals to control a dynamic system. Some implementations relate to a broad class of control policies that take estimates of the system state as inputs, and compute outputs that actuate the system dynamics.

After determining the control policy, the computing device 608 determines an action plan based on the nonlinear control policy. For example, the action plan may include using other vehicles to follow or catch up to the vehicles 602A, 602B, and 602C based on the predicted future velocities or positions of the vehicles 602A, 602B, and 602C. The computing device 608 may transmit a control signal 610A or 610B to an external machine 612A or 612B to cause the external machine to perform or simulate at least a part of the determined action plan. For example, as illustrated, the external machine 612A is a server that receives the control signal 610A to simulate at least a part of the determined action plan. The external machine 612B is a vehicle that receives the control signal 610B to perform at least a part of the determined action plan. The external machine 612A may include all or a portion of the components of the computing machine 500. The external machine 612B may include all or a portion of the components of the computing machine 500, and those components may be configured to control operation of a vehicle (e.g., an airplane).

Some implementations are described above with vehicles being observed. However, the disclosed technology may be used to derive control policies for other things also. For example, in place of vehicles, pedestrians, foot soldiers, animals (e.g., a herd of sheep or a flock of birds), or the like may be observed.

Figure 7:
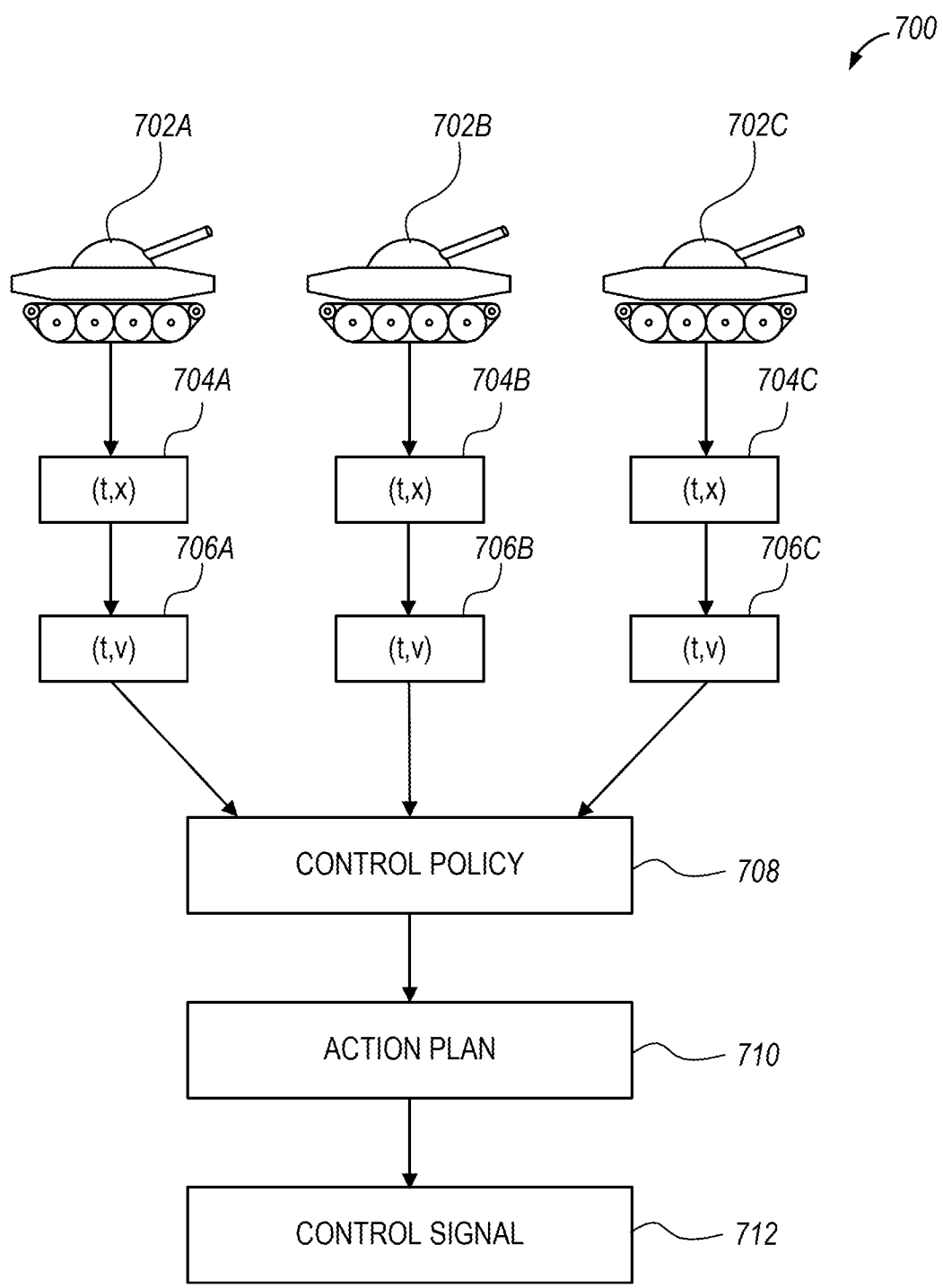
FIG. 7 is a data flow diagram of a technique for control policy identification, in accordance with some embodiments.

FIG. 7 is a data flow diagram of a technique 700 for control policy identification, in accordance with some embodiments. As shown in FIG. 7, vehicles 702A, 702B, and 702C are observed by sensor(s) coupled with computing device(s). While three vehicles 702A, 702B, and 702C are illustrated, the disclosed technology may be implemented with other numbers of vehicles. Historical time and position (t, x) data 704A, 704B, and 704C are generated, by the computing device(s), for each vehicle 702A, 702B, and 702C, respectively. For each vehicle 702A, 702B, and 702C, historical time and velocity (t, v) data 706A, 706B, and 706C are derived, by the computing device(s), from the historical time and position data 704A, 704B, and 704C, for example, by calculating the velocity as the first derivative of the position with respect to time or (if there are discrete measurements of position) by calculating the velocity as the change in position divided by the change in time.

The combination of the historical time and velocity data 706A, 706B, and 706C for the vehicles 702A, 702B, and 702C is used to identify, by the computing devices(s), a control policy 708 that controls the movement of the vehicles 702A, 702B, and 702C. The control policy 708 may be represented as a weighted combination of a set of predefined policies. The set of predefined policies may include an alignment policy for aligning the heading of vehicles 702A, 702B, and 702C, a cohesion policy of the vehicles 702A, 702B, and 702C to keep them close together, and/or a repulsion policy between the vehicles 702A, 702B, and 702C to keep them from coming too close together.

An action plan 710 is generated, by the computing device(s), responsive to the control policy 708. The action plan 710 may include moving sensor(s), machine(s), and/or other vehicle(s) based on the movement of the observed vehicles 702A, 702B, and 702C. The moved vehicles may be different from the observed vehicles 702A, 702B, and 702C. The moved sensor(s) may be the same as or different from the sensor(s) that observed the vehicles 702A, 702B, and 702C to generate the historical time and position data 704A, 704B, and 704C. The computing device(s) may transmit a control signal 712 (or multiple control signals) to cause implementation of the action plan 710 or simulation of the action plan at machine(s) different from the computing device(s).

As described above, the historical time and velocity data 706A, 706B, and 706C is derived from the historical time and position data 704A, 704B, and 704C. In alternative implementations, the computing device(s) may derive the historical time and velocity data 706A, 706B, and 706C directly from the sensor data without first generating the historical time and position data 704A, 704B, and 704C.

Figure 8:
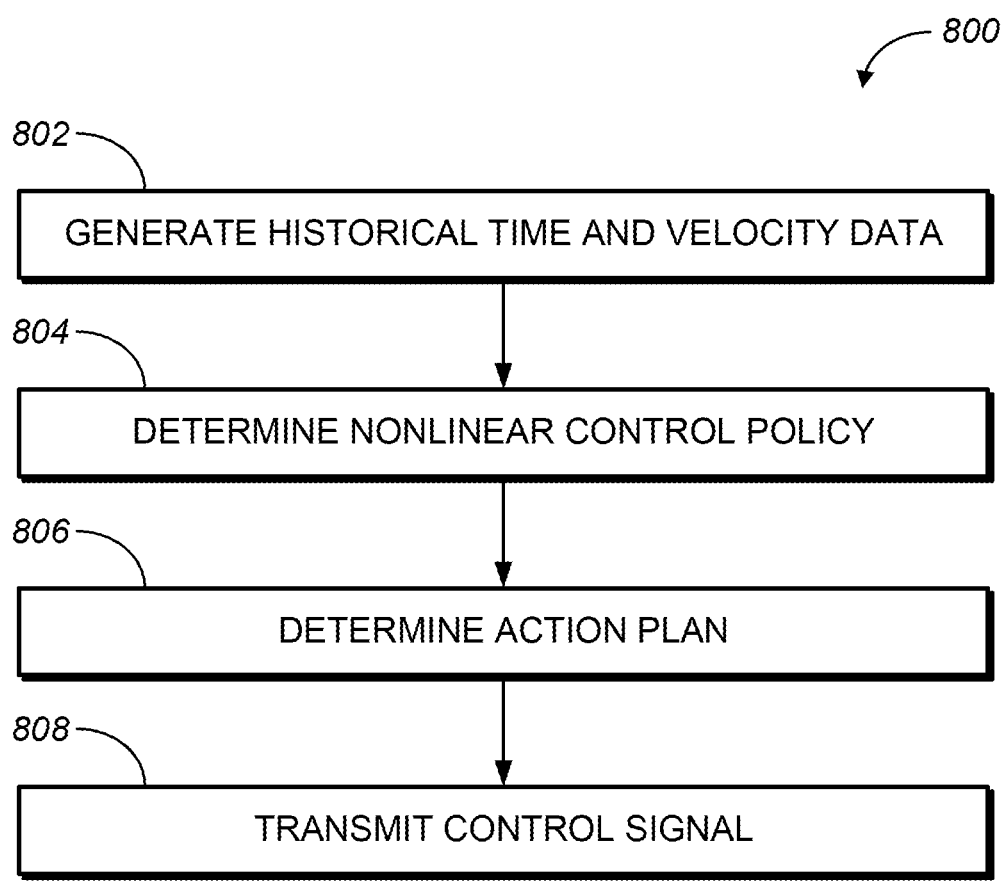
FIG. 8 is a flow chart of a method for control policy identification, in accordance with some embodiments.

FIG. 8 is a flow chart of a method 800 for control policy identification, in accordance with some embodiments. The method 800 may be implemented by a computing device, such as the computing machine 500 or the computing device 608.

At block 802, the computing device generates historical time and velocity data for a plurality of vehicles based on sensor data from one or more sensors observing the plurality of vehicles. According to some examples, the sensors access visual, radar, lidar, or similar data of the observed vehicles. The computing machine receives the accessed visual, radar, lidar, or similar data from the sensors and computes the historical time and velocity data based on the sensor data. In some cases, historical time and position data may be computed as an intermediate step.

At block 804, the computing device determines, based on the historical time and velocity data, a nonlinear control policy that controls movement of the plurality of vehicles. The nonlinear control policy is represented as a weighted combination of a set of predefined policies. The computing device determines the nonlinear control policy by calculating weights or parameters for a weighted combination of the set of predefined policies that minimizes a residual error term. The residual error term is computed based on a difference between the historical time and velocity data and predicted time and velocity data associated with the weighted combination of the set of predefined policies. While some implementations are described in conjunction with a nonlinear control policy being determined, it should be noted that the disclosed technology may also be used to determine a linear control policy, if a linear control policy is being applied.

The nonlinear control policy may be computed using iterative least squares techniques or using a mixed integer linear program (MILP) or a mixed integer quadratic program (MIQP). As used herein, MILP and MIQP include techniques for minimizing the residual error as either a linear or a quadratic function, respectively, where additional binary variables are used to represent logical OR constraints on the allowable combination of candidate policies. Alternatively, other techniques could be used to identify the nonlinear control policy. For example, the artificial intelligence or machine learning techniques described in conjunction with FIGS. 1-4 may be used to identify the nonlinear control policy.

According to some implementations, the plurality of vehicles may be traveling in a swarm with a swarm leader vehicle leading the other vehicles and other vehicles following (e.g., moving toward or moving in the same direction as) by reacting to the motion of the swarm leader vehicle.

Determining the nonlinear control policy includes identifying a swarm leader vehicle of the plurality of vehicles and/or other vehicles following the swarm leader vehicle. Alternatively, the control policy may be determined, and the swarm leader vehicle and/or the other vehicles following the swarm leader vehicle may be identified based on the control policy. The swarm leader vehicle and/or the other vehicles may be identified after determination of the control policy. It should be noted that the leader vehicle may be located anywhere within the swarm; the swarm leader might or might not be literally in the lead (in the front). The computing device may output an indication of the swarm leader vehicle and/or the other vehicles.

At block 806, the computing device determines an action plan based on the determined nonlinear control policy. The action plan may be responsive to the nonlinear control policy. For example, the action plan may involve one or more other vehicles (e.g., controlled by an entity associated with the computing device and not associated with the plurality of vehicles) travelling to a destination expected, based on the nonlinear control policy, to be visited by the plurality of vehicles in the future.

At block 808, the computing device transmits, to a machine external to the computing device (e.g., one or more of the other vehicles), a control signal causing the machine to perform or simulate at least part of the determined action plan. For example, if the control signal is transmitted to a standalone computer server, the computer server may simulate (e.g., using the artificial intelligence or machine learning techniques described in conjunction with FIGS. 1-4 or using other computer-implemented techniques) at least a part of the determined action plan. If the control signal is transmitted to an onboard computer of a vehicle, the vehicle may perform at least a part of the determined action plan.

In some implementations, the computing device predicts future velocity or position data of the plurality of vehicles using the determined nonlinear control policy. The action plan may include an action in response to the predicted future velocity or position data of the plurality of vehicles.

In some implementations, the control policy includes one or more command signals being provided to at least a portion of the plurality of vehicles. For example, the command signals may be provided from the swarm leader vehicle to other vehicles or from a controlling device (external to the plurality of vehicles) to the plurality of vehicles. The computing device may identify, for example using an algorithm implemented using software, hardware, or a combination of software and hardware, a rate at which the command signals are transmitted in accordance with the control policy. The rate may be constant (e.g., one command signal every three seconds) or may vary based on the time, the positions of one or more of the vehicles, or the velocities of one or more of the vehicles.

Some implementations include the use of sparse identification of nonlinear dynamics to learn control policies from observed vehicle trajectory data. Some implementations use characteristics of the learned policies to deduce information about a system of vehicles. Some implementations relate to sparse identification of nonlinear control policies.

Sparse identification of nonlinear control policies may be applied to the problem of swarm leader detection. A swarm of robotic vehicles may be controlled through decentralized control policies known as flocking, where each vehicle uses its own locally available information about neighboring vehicles to determine its planned motion. In many cases, one vehicle serves as the leader of the swarm, navigating with its own private objectives while also flocking with neighbors.

An example swarm leader detection algorithm may include the following operations.

A computing device (e.g., the computing machine 500 or the computing device 608) computes the velocity of each vehicle from observed position data. If variable, the velocity may be based on applying a potential function that influences both speed and direction.

The computing device considers several candidate policies for directional guidance, including alignment, cohesion and repulsion contributors. The computing device may draw from a family of attraction or repulsion functions and/or weighted velocity alignment functions.

The computing device finds the weighted combination of policies to minimize residual error. Optionally, the computing device may include integer constraints in optimization to allow only selected combinations of policies. This becomes a mixed-integer linear or quadratic program as opposed to a traditional iterative least squares algorithm. The computing device may eliminate low-weighted policies from the solution. If the number of remaining policies is sufficiently small, a weighted combination of the policies may be found. Otherwise, additional policies may be eliminated.

Based on the weighted combination of policies, the computing device determines the leader vehicle. In the case of variable-speed swarms, the leader vehicle is the one with the highest average alignment weight. In the case of fixed-speed swarms where on the heading changes, a set of alternate control policies are computed sequentially, each one assuming a different vehicle is the leader. The leader vehicle is the one that yields the smallest residual error for all other vehicles when it is assumed to be the leader.

The disclosed techniques may be adapted to solve other types of problems. In some cases, information may be deduced from parameters that appear in the learned control policies.

Some implementations are described as numbered examples (Example 1, 2, 3, etc.). These are provided as examples only and do not limit the technology disclosed herein.

Example 1 is a method comprising: generating, at a computing device, historical time and velocity data for a plurality of vehicles based on sensor data from one or more sensors observing the plurality of vehicles; determining, based on the historical time and velocity data, a nonlinear control policy that controls movement of the plurality of vehicles, wherein the nonlinear control policy is represented as a weighted combination of a set of predefined policies, wherein determining the nonlinear control policy comprises calculating weights or parameters for a weighted combination of the set of predefined policies that minimizes a residual error term, wherein the residual error term is computed based on a difference between the historical time and velocity data and predicted time and velocity data associated with the weighted combination of the set of predefined policies; determining an action plan based on the determined nonlinear control policy; and transmitting, to a machine external to the computing device, a control signal causing the machine to perform or simulate at least a part of the determined action plan.

In Example 2, the subject matter of Example 1 includes, wherein the sensor data comprises historical time and position data for the plurality of vehicles, wherein the historical time and velocity data is generated based on the historical time and position data.

In Example 3, the subject matter of Examples 1-2 includes, wherein the residual error term is computed using iterative least squares.

In Example 4, the subject matter of Examples 1-3 includes, wherein the residual error term is computed using a mixed integer quadratic program (MIQP).

In Example 5, the subject matter of Examples 1-4 includes, wherein determining the nonlinear control policy comprises identifying a swarm leader vehicle of the plurality of vehicles, the method further comprising: providing an output indicating the identified swarm leader vehicle.

In Example 6, the subject matter of Examples 1-5 includes, wherein determining the nonlinear control policy comprises identifying vehicles following the swarm leader vehicle.

In Example 7, the subject matter of Examples 1-6 includes, predicting future velocity or position data of the plurality of vehicles using the determined nonlinear control policy, wherein the action plan comprises an action in response to the predicted future velocity or position data of the plurality of vehicles.

In Example 8, the subject matter of Examples 1-7 includes, wherein the control policy comprises one or more command signals, the method further comprising: identifying a rate at which the command signals are transmitted in accordance with the control policy.

Example 9 is a non-transitory computer-readable medium storing instructions which, when executed by a computing device, cause the computing device to perform operations comprising: generating historical time and velocity data for a plurality of vehicles based on sensor data from one or more sensors observing the plurality of vehicles; determining, based on the historical time and velocity data, a nonlinear control policy that controls movement of the plurality of vehicles, wherein the nonlinear control policy is represented as a weighted combination of a set of predefined policies, wherein determining the nonlinear control policy comprises calculating weights or parameters for a weighted combination of the set of predefined policies that minimizes a residual error term, wherein the residual error term is computed based on a difference between the historical time and velocity data and predicted time and velocity data associated with the weighted combination of the set of predefined policies; determining an action plan based on the determined nonlinear control policy; and transmitting, to a machine external to the computing device, a control signal causing the machine to perform or simulate at least a part of the determined action plan.

In Example 10, the subject matter of Example 9 includes, wherein the sensor data comprises historical time and position data for the plurality of vehicles, wherein the historical time and velocity data is generated based on the historical time and position data.

In Example 11, the subject matter of Examples 9-10 includes, wherein the residual error term is computed using iterative least squares.

In Example 12, the subject matter of Examples 9-11 includes, wherein the residual error term is computed using a mixed integer quadratic program (MIQP).

In Example 13, the subject matter of Examples 9-12 includes, wherein determining the nonlinear control policy comprises identifying a swarm leader vehicle of the plurality of vehicles, the operations further comprising: providing an output indicating the identified swarm leader vehicle.

In Example 14, the subject matter of Examples 9-13 includes, wherein determining the nonlinear control policy comprises identifying vehicles following the swarm leader vehicle.

In Example 15, the subject matter of Examples 9-14 includes, the operations further comprising: predicting future velocity or position data of the plurality of vehicles using the determined nonlinear control policy, wherein the action plan comprises an action in response to the predicted future velocity or position data of the plurality of vehicles.

In Example 16, the subject matter of Examples 9-15 includes, wherein the control policy comprises one or more command signals, the operations further comprising: identifying a rate at which the command signals are transmitted in accordance with the control policy.

Example 17 is a computing device comprising: processing circuitry; and a memory storing instructions which, when executed by the processing circuitry, cause the processing circuitry to perform operations comprising: generating historical time and velocity data for a plurality of vehicles based on sensor data from one or more sensors observing the plurality of vehicles; determining, based on the historical time and velocity data, a nonlinear control policy that controls movement of the plurality of vehicles, wherein the nonlinear control policy is represented as a weighted combination of a set of predefined policies, wherein determining the nonlinear control policy comprises calculating weights or parameters for a weighted combination of the set of predefined policies that minimizes a residual error term, wherein the residual error term is computed based on a difference between the historical time and velocity data and predicted time and velocity data associated with the weighted combination of the set of predefined policies; determining an action plan based on the determined nonlinear control policy; and transmitting, to a machine external to the computing device, a control signal causing the machine to perform or simulate at least a part of the determined action plan.

In Example 18, the subject matter of Example 17 includes, wherein the sensor data comprises historical time and position data for the plurality of vehicles, wherein the historical time and velocity data is generated based on the historical time and position data.

In Example 19, the subject matter of Examples 17-18 includes, wherein the residual error term is computed using iterative least squares.

In Example 20, the subject matter of Examples 17-19 includes, wherein the residual error term is computed using a mixed integer quadratic program (MIQP).

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   generating, at a computing device, historical time and velocity data for a plurality of vehicles based on sensor data from one or more sensors observing the plurality of vehicles;
   determining, based on the historical time and velocity data, a nonlinear control policy that controls movement of the plurality of vehicles, wherein the nonlinear control policy is represented as a weighted combination of a set of predefined policies, wherein determining the nonlinear control policy comprises calculating weights or parameters for a weighted combination of the set of predefined policies that minimizes a residual error term, wherein the residual error term is computed based on a difference between the historical time and velocity data and predicted time and velocity data associated with the weighted combination of the set of predefined policies, wherein the nonlinear control policy is computed using at least one of iterative least squares techniques, a mixed integer linear program (MILP), a mixed integer quadratic program (MIQP), or artificial intelligence techniques, wherein determining the nonlinear control policy comprises identifying a swarm leader vehicle of the plurality of vehicles;
   determining an action plan based on the determined nonlinear control policy, wherein determining the action plan comprises making an identification, based on the nonlinear control policy, of at least one of: a target being approached by the plurality of vehicles, a future position of the plurality of vehicles, or a future velocity of the plurality of vehicles, and selecting a responsive action based on the identification;
   transmitting, to a machine external to the computing device, a control signal causing the machine to perform or simulate at least a part of the determined action plan, wherein the machine comprises a vehicle to perform the at least the part of the determined action plan by performing a physical movement to defend an identified target based on the nonlinear control policy, the physical movement representing a specific transformation of a position or an orientation of the vehicle in physical space; and
   providing an output indicating the identified swarm leader vehicle.

2. The method of claim 1, wherein the sensor data comprises historical time and position data for the plurality of vehicles, wherein the historical time and velocity data is generated based on the historical time and position data.

3. The method of claim 1, wherein the residual error term is computed using iterative least squares.

4. The method of claim 1, wherein the residual error term is computed using the mixed integer quadratic program (MIQP).

5. The method of claim 1, wherein determining the nonlinear control policy comprises identifying vehicles following the swarm leader vehicle.

6. The method of claim 1, further comprising:
   predicting future velocity or position data of the plurality of vehicles using the determined nonlinear control policy, wherein the action plan comprises an action in response to the predicted future velocity or position data of the plurality of vehicles.

7. The method of claim 1, wherein the control policy comprises one or more command signals, the method further comprising:
   identifying a rate at which the command signals are transmitted in accordance with the control policy.

8. A non-transitory computer-readable medium storing instructions which, when executed by a computing device, cause the computing device to perform operations comprising:
   generating historical time and velocity data for a plurality of vehicles based on sensor data from one or more sensors observing the plurality of vehicles;
   determining, based on the historical time and velocity data, a nonlinear control policy that controls movement of the plurality of vehicles, wherein the nonlinear control policy is represented as a weighted combination of a set of predefined policies, wherein determining the nonlinear control policy comprises calculating weights or parameters for a weighted combination of the set of predefined policies that minimizes a residual error term, wherein the residual error term is computed based on a difference between the historical time and velocity data and predicted time and velocity data associated with the weighted combination of the set of predefined policies, wherein the nonlinear control policy is computed using at least one of iterative least squares techniques, a mixed integer linear program (MILP), a mixed integer quadratic program (MIQP), or artificial intelligence techniques, wherein determining the nonlinear control policy comprises identifying a swarm leader vehicle of the plurality of vehicles;

determining an action plan based on the determined nonlinear control policy, wherein determining the action plan comprises making an identification, based on the nonlinear control policy, of at least one of: a target being approached by the plurality of vehicles, a future position of the plurality of vehicles, or a future velocity of the plurality of vehicles, and selecting a responsive action based on the identification;

transmitting, to a machine external to the computing device, a control signal causing the machine to perform or simulate at least a part of the determined action plan, wherein the machine comprises a vehicle to perform the at least the part of the determined action plan by performing a physical movement to defend an identified target based on the nonlinear control policy, the physical movement representing a specific transformation of a position or an orientation of the vehicle in physical space; and providing an output indicating the identified swarm leader vehicle.

9. The computer-readable medium of claim 8, wherein the sensor data comprises historical time and position data for the plurality of vehicles, wherein the historical time and velocity data is generated based on the historical time and position data.

10. The computer-readable medium of claim 8, wherein the residual error term is computed using iterative least squares.

11. The computer-readable medium of claim 8, wherein the residual error term is computed using the mixed integer quadratic program (MIQP).

12. The computer-readable medium of claim 8, wherein determining the nonlinear control policy comprises identifying vehicles following the swarm leader vehicle.

13. The computer-readable medium of claim 8, the operations further comprising:

predicting future velocity or position data of the plurality of vehicles using the determined nonlinear control policy, wherein the action plan comprises an action in response to the predicted future velocity or position data of the plurality of vehicles.

14. The computer-readable medium of claim 8, wherein the control policy comprises one or more command signals, the operations further comprising:

identifying a rate at which the command signals are transmitted in accordance with the control policy.

15. A computing device comprising:

processing circuitry; and a memory storing instructions which, when executed by the processing circuitry, cause the processing circuitry to perform operations comprising:

generating historical time and velocity data for a plurality of vehicles based on sensor data from one or more sensors observing the plurality of vehicles;

determining, based on the historical time and velocity data, a nonlinear control policy that controls movement of the plurality of vehicles, wherein the nonlinear control policy is represented as a weighted combination of a set of predefined policies, wherein determining the nonlinear control policy comprises calculating weights or parameters for a weighted combination of the set of predefined policies that minimizes a residual error term, wherein the residual error term is computed based on a difference between the historical time and velocity data and predicted time and velocity data associated with the weighted combination of the set of predefined policies, wherein the nonlinear control policy is computed using at least one of iterative least squares techniques, a mixed integer linear program (MILP), a mixed integer quadratic program (MIQP), or artificial intelligence techniques, wherein determining the nonlinear control policy comprises identifying a swarm leader vehicle of the plurality of vehicles;

determining an action plan based on the determined nonlinear control policy, wherein determining the action plan comprises making an identification, based on the nonlinear control policy, of at least one of: a target being approached by the plurality of vehicles, a future position of the plurality of vehicles, or a future velocity of the plurality of vehicles, and selecting a responsive action based on the identification;

transmitting, to a machine external to the computing device, a control signal causing the machine to perform or simulate at least a part of the determined action plan, wherein the machine comprises a vehicle to perform the at least the part of the determined action plan by performing a physical movement to defend an identified target based on the nonlinear control policy, the physical movement representing a specific transformation of a position or an orientation of the vehicle in physical space; and providing an output indicating the identified swarm leader vehicle.

16. The computing device of claim 15, wherein the sensor data comprises historical time and position data for the plurality of vehicles, wherein the historical time and velocity data is generated based on the historical time and position data.

17. The computing device of claim 15, wherein the residual error term is computed using iterative least squares.

18. The computing device of claim 15, wherein the residual error term is computed using the mixed integer quadratic program (MIQP).

* * * * *